United States Patent
Marshall et al.

(10) Patent No.: US 10,171,421 B2
(45) Date of Patent: Jan. 1, 2019

(54) INTRUSION PREVENTION AND DETECTION IN A WIRELESS NETWORK

(71) Applicant: Traffic Observation Via Management Limited, Belfast (GB)

(72) Inventors: Alan James Marshall, Belfast (GB); Bosheng Zhou, Belfast (GB); Alastair McKinley, Belfast (GB)

(73) Assignee: TRAFFIC OBSERVATION VIA MANAGEMENT LIMITED (GB)

( * ) Notice: Subject to any disclaimer, the term of this patent is extended or adjusted under 35 U.S.C. 154(b) by 0 days.

(21) Appl. No.: 14/646,441

(22) PCT Filed: Nov. 1, 2013

(86) PCT No.: PCT/GB2013/052856
§ 371 (c)(1),
(2) Date: May 21, 2015

(87) PCT Pub. No.: WO2014/080170
PCT Pub. Date: May 30, 2014

(65) Prior Publication Data
US 2015/0304280 A1    Oct. 22, 2015

(30) Foreign Application Priority Data
Nov. 21, 2012 (GB) .................................. 1220957.3

(51) Int. Cl.
*H04L 29/06* (2006.01)
*H04W 12/12* (2009.01)

(52) U.S. Cl.
CPC ...... *H04L 63/0227* (2013.01); *H04L 63/1433* (2013.01); *H04L 63/1458* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2003/0123479 A1* | 7/2003 | Lee | ......................... H04L 47/10 370/466 |
| 2004/0098618 A1* | 5/2004 | Kim | .................... H04L 63/1458 726/23 |

(Continued)

FOREIGN PATENT DOCUMENTS

WO    WO-2012/065632 A1    5/2012

OTHER PUBLICATIONS

International Search Report and Written Opinion for International Application No. PCT/GB2013/052856 dated Dec. 16, 2013.

*Primary Examiner* — Phy Anh Vu
(74) *Attorney, Agent, or Firm* — Foley & Lardner LLP

(57) ABSTRACT

The invention provides an intrusion detection and prevention system and computer program which, when operated or executed by a security element (7) situated between a receiver (3) and a media access control (MAC) element (5) of a device (1) of a wireless network, performs the steps of receiving wireless traffic from the receiver of the device, and detecting that MAC element the traffic is allowed according to one or more rules and passing the traffic to the MAC element of the device, or detecting that the traffic is not allowed according to the one or more rules and preventing the traffic from passing to the MAC element of the device.

21 Claims, 3 Drawing Sheets

(52) U.S. Cl.
CPC ......... *H04L 63/1466* (2013.01); *H04W 12/12* (2013.01); *H04L 63/16* (2013.01)

(56) References Cited

U.S. PATENT DOCUMENTS

| | | | |
|---|---|---|---|
| 2005/0144544 A1* | 6/2005 | Gariador | H04L 63/1408 714/724 |
| 2005/0226423 A1* | 10/2005 | Li | H04L 63/062 380/278 |
| 2006/0070122 A1 | 3/2006 | Bellovin | |
| 2006/0168273 A1* | 7/2006 | Michael | H04L 63/0209 709/230 |
| 2006/0179432 A1* | 8/2006 | Walinga | H04L 41/0806 717/171 |
| 2007/0019543 A1* | 1/2007 | Wei | H04L 63/1458 370/229 |
| 2007/0025265 A1 | 2/2007 | Porras et al. | |
| 2007/0149133 A1* | 6/2007 | Lee | H04W 24/00 455/67.11 |
| 2007/0153694 A1* | 7/2007 | Gustin | H04L 69/22 370/235 |
| 2007/0263562 A1* | 11/2007 | Tang | H04L 63/1458 370/328 |
| 2011/0321161 A1* | 12/2011 | Shanmugavadivel | H04W 12/12 726/22 |
| 2012/0140630 A1* | 6/2012 | McGrath | H04L 47/10 370/235 |
| 2015/0207724 A1* | 7/2015 | Choudhury | H04L 41/12 370/255 |

\* cited by examiner

INTRUSION PREVENTION AND DETECTION IN A WIRELESS NETWORK

RELATED APPLICATIONS

This application is a U.S. National Stage of International Application Number PCT/GB2013/052856, filed Nov. 1, 2013, which claims the benefit of priority to GB Application Number 1220957.3, filed Nov. 21, 2012. The entire contents of the foregoing are hereby incorporated herein by reference for all purposes.

The invention relates to an intrusion prevention and detection system, computer program and method operable in a device or devices of a wireless network.

The popularity of wireless networks, such as wireless local area networks (WLANs)/WiFi networks, has had a profound growth in the last decade. It has become the norm, for example, for cafes to use WiFi networks, or 'hotspots', to provide their customers with access to the Internet, and the use of such networks by stores and restaurants to provide mobile point of sale (POS) devices is increasing. As with wired networks, the security of wireless networks is an important issue. Hackers that succeed in breaking into a wireless network can use various attack types to, for example, compromise network functionality and steal information from users of the network. Approaches to wireless security have included provision of a plurality of sensors in the wireless network, which monitor wireless traffic for attacks. Such an approach, however, requires a complex overlay network, which often proves too expensive for many wireless network providers.

According to a first aspect of the invention there is provided an intrusion detection and prevention computer program which, when executed provides a security element situated between a receiver and a media access control (MAC) element of a device of a wireless network, which security element performs the steps of:
receiving wireless traffic from the receiver of the device, and
detecting that the traffic is allowed according to one or more rules and passing the traffic to the MAC element of the device, or
detecting that the traffic is not allowed according to the one or more rules and preventing the traffic from passing to the MAC element of the device.

The intrusion detection and prevention computer program may output one or more signals to the MAC element which cause the MAC element to disconnect from the wireless traffic.

The intrusion detection and prevention computer program may output one or more signals to one or more further devices of the wireless network to prevent one or more types of attack on the devices.

According to a second aspect of the invention there is provided an intrusion detection and prevention system comprising a security element which is situated between a receiver and a media access control (MAC) element of a device of a wireless network, and which receives wireless traffic from the receiver of the device, and detects that the traffic is allowed according to one or more rules and passes the traffic to the MAC element of the device, or detects that the traffic is not allowed according to the one or more rules and prevents the traffic from passing to the MAC element of the device.

The security element may comprise software.

The intrusion detection and prevention system may output one or more signals to the MAC element which cause the MAC element to disconnect from the wireless traffic.

The intrusion detection and prevention system may output one or more signals to one or more further devices of the wireless network to prevent one or more types of attack on the devices.

Thus wireless traffic received by the device of the wireless network is passed to the security element and using the intrusion detection and prevention system and computer program of the invention, 'unallowed' traffic such as malicious traffic is detected and prevented from passing to the MAC element. Using the intrusion detection and prevention system and computer program of the invention, attacks can be detected and prevented before they reach the MAC element of the device, i.e. this is protected from beneath. Elements of the device situated beyond the MAC element from the receiver are also protected by the intrusion detection and prevention system and computer program of the invention. This therefore increases the security of the device and of the wireless network, and does so without the need for any additional security sensors in the network.

Detecting that the traffic is allowed or not allowed according to the one or more rules may comprise analysing the wireless traffic for a denial of service (DoS) attack. Analysing the wireless traffic for a DoS attack may comprise determining if the traffic comprises spoofed MAC frames. Analysing the wireless traffic for a DoS attack may comprise determining an arrival rate of the wireless traffic and comparing this with an acceptable threshold arrival rate. Analysing the wireless traffic for a DoS attack may comprise determining an arrival rate of wireless traffic comprising any of device authentication traffic, device de-authentication traffic, device association traffic, device disassociation traffic. Analysing the wireless traffic for a DoS attack may further comprise analysing any of address resolution protocol (ARP) data of the traffic, Internet control message protocol (ICMP) data of the traffic, transport control protocol (TCP) data of the traffic, Internet protocol (IP) data of the traffic, probe request data of the traffic, probe response data of the traffic, extensible authentication protocol (EAP) data of the traffic. These analyses are performed before the wireless traffic is passed to the MAC element.

Additionally or alternatively, detecting that the traffic is allowed or not allowed according to the one or more rules may comprise analysing the wireless traffic for a man-in-the-middle (MiTM) attack. Analysing the wireless traffic for a man-in-the-middle attack may comprise determining if the traffic comprises spoofed or forged traffic. Analysing the wireless traffic for a man-in-the-middle attack may comprise determining if the traffic comprises any of spoofed MAC layer frames, spoofed address resolution protocol (ARP) data, spoofed domain name system (DNS) data, spoofed dynamic host configuration protocol (DHCP) data.

Additionally or alternatively, detecting that the traffic is allowed or not allowed according to the one or more rules may comprise analysing the wireless traffic for traffic from an unauthorised device connected to the network. Analysing the wireless traffic for traffic from an unauthorised device connected to the network may comprise analysing for traffic from any of an unauthorised access point, an unauthorised client.

Additionally or alternatively, detecting that the traffic is allowed or not allowed according to the one or more rules may comprise analysing the wireless traffic for an encryption attack. The encryption attack may be a wired equivalent privacy (WEP) attack or a WiFi protected access (WPA) attack.

Additionally or alternatively, detecting that the traffic is allowed or not allowed according to the one or more rules may comprise analysing the wireless traffic by validating sequence numbers thereof. Analysing the wireless traffic by validating sequence numbers thereof may comprise validating sequence numbers of any of extensible authentication protocol (EAP) data of the traffic, extensible authentication protocol over local area network (EAPoL) data of the traffic, address resolution protocol (ARP) data of the traffic, deauthentication frames of the traffic, disassociation frames of the traffic.

Additionally or alternatively, detecting that the traffic is allowed or not allowed according to the one or more rules may comprise analysing the wireless traffic for exploitation of vulnerabilities in processing of MAC management frames. Analysing the wireless traffic for exploitation of vulnerabilities in the processing of MAC management frames may comprise determining an authentication mechanism for protecting MAC management frames. The authentication mechanism for protecting MAC management frames may comprise adding an authentication field to the MAC management frames. Such an approach will allow prevention of disassociation and deauthentication DoS attacks.

Additionally or alternatively, detecting that the traffic is allowed or not allowed according to the one or more rules may comprise analysing the wireless traffic for Internet control message protocol (ICMP) attacks. Analysing the wireless traffic for ICMP attacks may comprise any of detecting attacks based on ICMP size to prevent Ping of Death attacks, detecting attacks by checking ICMP destination addresses to prevent ICMP Smurf attacks, detecting attacks by validating ICMP port fields to prevent universal datagram protocol (UDP) ICMP port unreachable scanning attacks.

Additionally or alternatively, detecting that the traffic is allowed or not allowed according to the one or more rules may comprise analysing the wireless traffic for transport control protocol (TCP) attacks. Analysing the wireless traffic for TCP attacks may comprise any of detecting TCP SYN attacks, detecting TCP connect scanning attacks, detecting TCP FIN scanning attacks, detecting attacks based on TCP SYN/FIN arrival rate to prevent TCP/SYN/FIN scanning attacks.

Additionally or alternatively, detecting that the traffic is allowed or not allowed according to the one or more rules may comprise analysing the wireless traffic for Internet protocol (IP) attacks. Analysing the wireless traffic for IP attacks may comprise any of detecting attacks by sequence validation and received signal strength indication (RSSI) to prevent IP spoofing attacks, detecting attacks by comparing IP addresses in IP headers to prevent Land attacks.

Additionally or alternatively, detecting that the traffic is allowed or not allowed according to the one or more rules may comprise analysing the wireless traffic for received signal strength indication (RSSI). This may prevent spoofing attacks such as IP spoofing attacks, MAC spoofing attacks, beacons and probes.

Detecting that the traffic is allowed according to the one or more rules may comprise marking the traffic for further inspection by the MAC element of the device or another element of the device.

Preventing the traffic from passing to the MAC element of the device may comprise destroying the traffic. Preventing the traffic from passing to the MAC element of the device may further comprise releasing memory used to store the traffic. Preventing the traffic from passing to the MAC element of the device may comprise detecting that traffic from a source is not allowed and dropping subsequent traffic from the source for a period of time.

The intrusion detection and prevention system and computer program may perform further functions comprising any of sending alerts to an administrator of the wireless network, logging activity on the wireless network, conducting authentication of devices of the wireless network, reporting one or more conditions within the network e.g. RSSI values and beacon rates.

It will be appreciated that the intrusion detection and prevention system and computer program may detect and prevent a plurality of attacks from the wireless traffic.

According to a third aspect of the invention there is provided an intrusion detection and prevention method comprising the steps of:
receiving wireless traffic from a receiver of a device of a wireless network, and
detecting that the traffic is allowed according to one or more rules and passing the traffic to a MAC element of the device, or
detecting that the traffic is not allowed according to the one or more rules and preventing the traffic from passing to the MAC element of the device.

According to a fourth aspect of the invention there is provided a device of a wireless network comprising:
a receiver configured to receive wireless traffic from the network,
a media access control (MAC) element, and
an intrusion detection and prevention computer program according to the first aspect of the invention, providing a security element situated between the receiver and the MAC element and configured, when executed, to:
receive wireless traffic from the receiver of the device, and
detect that the traffic is allowed according to one or more rules and pass the traffic to the MAC element of the device, or
detect that the traffic is not allowed according to the one or more rules and prevent the traffic from passing to the MAC element of the device.

The intrusion detection and prevention computer program may provide a security element situated between a driver of the receiver of the device and the MAC element of the device.

The device may comprise an access point (AP) of the wireless network. The device may comprise a base station of the wireless network. The device may comprise any of a wireless terminal, a wireless station, a client of the wireless network, such as any of a desktop computer, a laptop computer, a notebook computer, a tablet computer, a smartphone, a PDA, a point of sale (POS) device, a device incorporating a wireless interface and a MAC element.

The device may be an existing device of a wireless network. The device may be a new device of a wireless network. Thus the intrusion detection and prevention computer program/system may be retro-fitted to an existing wireless network or may be provided as part of a new wireless network.

According to a fifth aspect of the invention there is provided a wireless network comprising one or more devices according to the fourth aspect of the invention.

The wireless network may comprise any of a WLAN, a wireless metropolitan area network (WMAN), a WiFi network, a WiMax network, a 3G network, a 4G network. The wireless network may comprise any wireless network installed and/or managed by mobile network operators (MNOs). The wireless network may comprise any wireless network installed and/or managed by an end user of the network.

The wireless network may comprise one or more devices comprising access points and one or more devices comprising any of a wireless terminal, a wireless station, a client. In a particular embodiment, the wireless network may comprise one or more devices comprising access points and one or more devices comprising POS devices. Such a network would be able to provide the security needed to meet the payment card industry (PCI) requirements.

According to a sixth aspect of the invention there is provided an intrusion detection and prevention computer program embodied in a computer readable medium which, when executed on one or more computers, performs the steps of:

receiving wireless traffic from a receiver of a device of a wireless network, and detecting that the traffic is allowed according to one or more rules and passing the traffic to a media access control (MAC) element of the device, or detecting that the traffic is not allowed according to the one or more rules and preventing the traffic from passing to the MAC element of the device.

Embodiments of the invention will now be described by way of example only, with reference to the accompanying drawings, in which.

Figure 1:
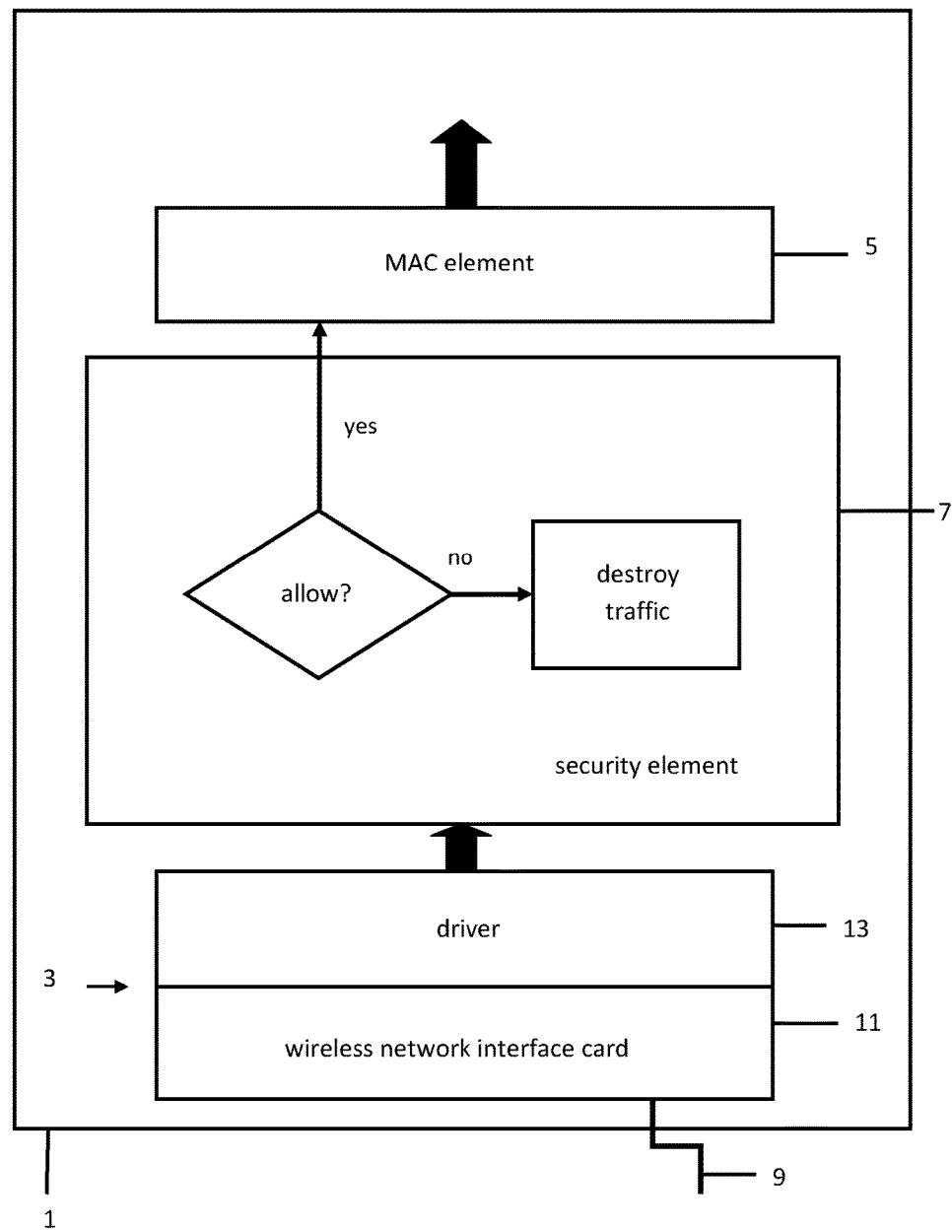
FIG. 1 is a schematic representation of a device according to the fourth aspect of the invention comprising an intrusion detection and prevention system/computer program according to the first and second aspects of the invention.

FIG. 1 illustrates a device 1 of a wireless network (not shown). In this embodiment, the device comprises an access point (AP) of the wireless network and receives and transmits wireless traffic from and to a plurality of point of sale (POS) devices of the network. The wireless network is located in a restaurant and is used to enable staff of the restaurant to provide a security-enhanced mobile payment service to customers. The device 1 has an intrusion detection and prevention system/computer program according to the invention and, on its own, is able to protect the network against at least MiTM and rogue device attacks. Additionally one or more of the POS devices may also have an intrusion detection and prevention system/computer program according to the invention and, together with the AP 1, are able to protect the network against at least DoS, MiTM and rogue device attacks. Thus the security of data transferred by the customer to a POS device to the network is increased.

The device 1 of FIG. 1 comprises a receiver 3, a media access control (MAC) element 5 and a security element 7 situated between the receiver 3 and the MAC element 5. The receiver 3 may be part of a transceiver, capable of receiving and sending wireless traffic from and to a network.

The receiver 3 comprises an antenna 9 connected to a wireless network interface card 11 which has a driver 13. The antenna 9 and the network interface card 11 are configured to receive wireless traffic from the network via the antenna 9, and pass the wireless traffic to the security element 7. The security element 7 has an intrusion detection and prevention system/computer program according to the invention embedded as software therein. The intrusion detection and prevention system/computer program software is configured, when executed, to receive the wireless traffic from the receiver 3 and either detect that the traffic is allowed according to one or more rules and pass the traffic to the MAC element 5 or detect that the traffic is not allowed according to the one or more rules and prevent the traffic from passing to the MAC element 5. The MAC element 5 receives allowed wireless traffic and carries out standard MAC layer protocol functions on the traffic and passes the traffic to higher protocol layer elements of the device 1 (not shown).

The intrusion detection and prevention system/computer program software embedded in the security element 7 is able to detect and prevent various attacks on the device 1 carried out by means of the wireless traffic received by the device 1. Two examples of such attack detection and prevention will now be described, with reference to FIGS. 2 and 3. It will appreciated however that the intrusion detection and prevention system/computer program of the invention is able to carry out many more examples of intrusion detection and prevention.

Figure 2:
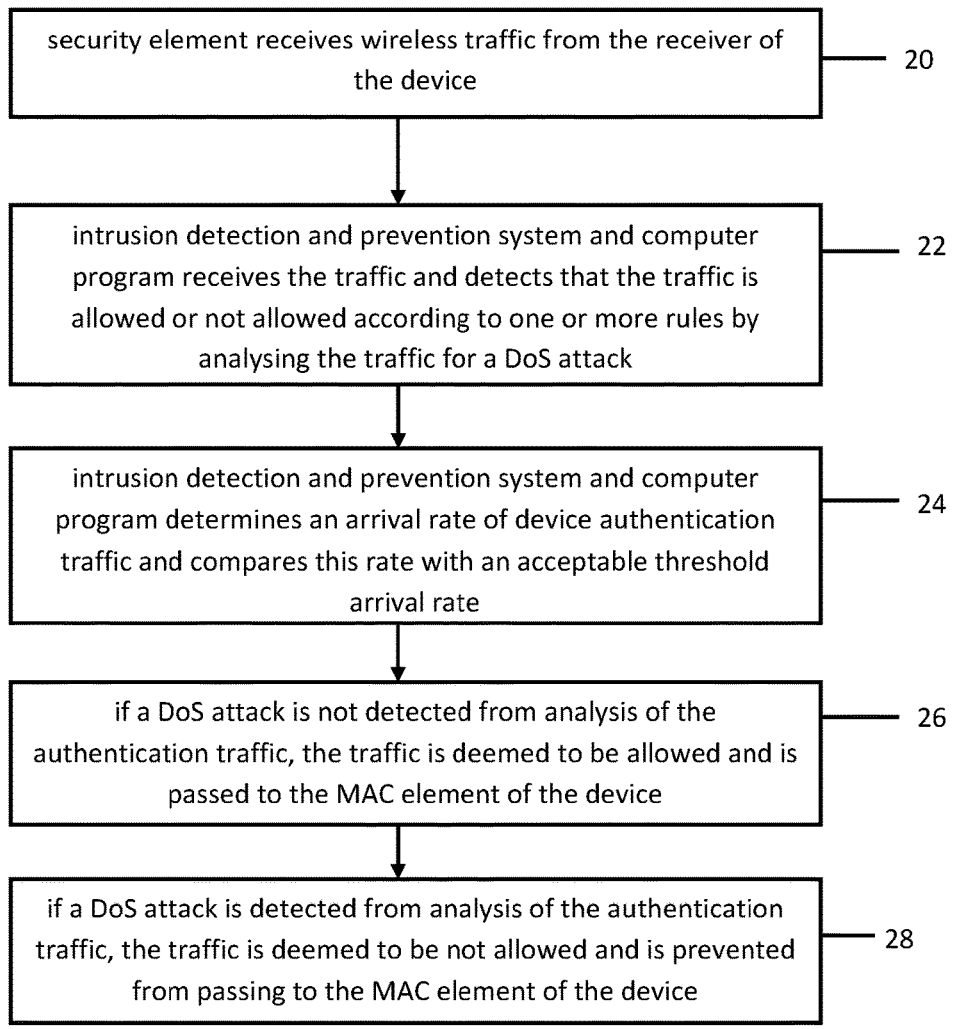
FIG. 2 is a schematic representation of a first intrusion detection and prevention method according to the third aspect of the invention carried out by the device of FIG. 1.

Referring to FIG. 2, the security element 7 receives wireless traffic from the receiver 3 of the AP device 1 (step 20). The intrusion detection and prevention system/computer program software embedded in the security element 7 receives the traffic and detects that the traffic is allowed or not allowed according to one or more rules by analysing the traffic for a DoS attack (step 22). In this embodiment, this comprises determining an arrival rate of device authentication traffic of the wireless traffic and comparing this rate with an acceptable threshold arrival rate (step 24). The device authentication traffic may comprise any of extensible authentication protocol over local area networks (EAPoL) Start traffic, EAPoL LogOff traffic, EAP-SUCCESS traffic, EAP-FAILURE traffic. If a DoS attack is not detected from analysis of the authentication traffic, the traffic is deemed to be allowed and is passed to the MAC element 5 of the device 1 (step 26). If a DoS attack is detected from analysis of the authentication traffic, the traffic is deemed to be not allowed and is prevented from passing to the MAC element 5 of the device 1 by destroying the traffic (step 28). DoS attacks can be used to destroy device connectivity in the network and to reduce network performance. Thus the intrusion detection and prevention system/computer program of the invention enables protection of devices in the network from these unwanted effects. Furthermore, the intrusion detection and prevention system/computer program allows detection and protection of a device without unduly affecting the throughput performance of the device.

Figure 3:
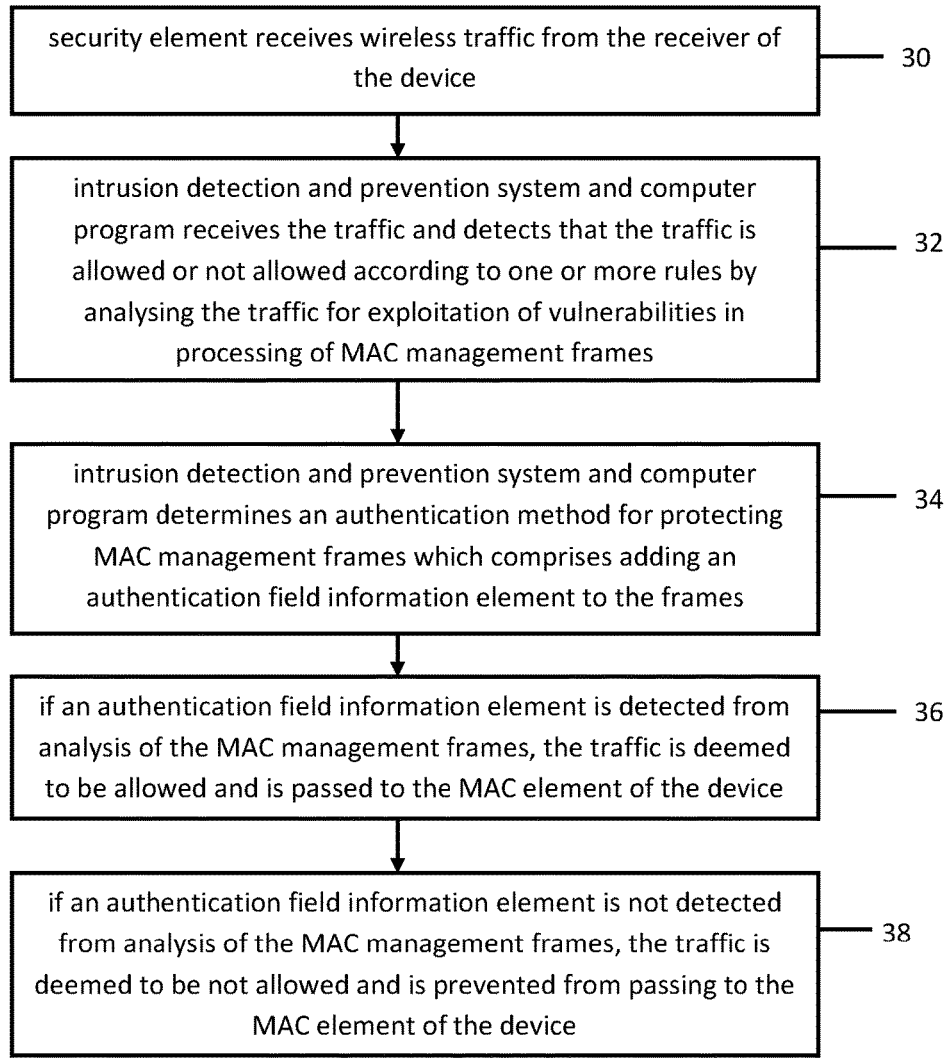
FIG. 3 is a schematic representation of a second intrusion detection and prevention method according to the third aspect of the invention carried out by the device of FIG. 1.

Referring to FIG. 3, the security element 7 receives wireless traffic from the receiver 3 of the AP device 1 (step 30). The intrusion detection and prevention system/computer program software embedded in the security element 7 receives the traffic and detects that the traffic is allowed or not allowed according to one or more rules by analysing the traffic for exploitation of vulnerabilities in processing of MAC management frames (step 32). In this embodiment, analysing the wireless traffic for exploitation of vulnerabilities in the processing of MAC management frames comprises determining an authentication mechanism for protecting MAC management frames, which comprises adding an authentication field in the form of an information element (IE) to the MAC management frames (step 34). If the authentication field information element is detected from analysis of the MAC management frames, the traffic is deemed to be allowed and is passed to the MAC element 5 of the device 1 (step 36). If the authentication field information element is not detected from analysis of the MAC management frames, the traffic is deemed to be not allowed and is prevented from passing to the MAC element 5 of the device 1 by destroying the traffic (step 38).

The invention claimed is:

1. A non-transitory computer-readable storage medium storing executable instructions which, when executed on one or more processors of a device of a wireless network, causes the one or more processors to:
provide a security element comprising an intrusion detection and prevention (IDS) computer program, the security element located in between a physical layer of a receiver of the device and a media access control (MAC) layer of the device, the security element configured to interface with a driver of a wireless network interface of the receiver and control traffic flow between the physical layer of the receiver of the device and the MAC layer of the device;
receive wireless traffic, at the physical layer of the receiver of the device, the wireless traffic comprising first traffic and second traffic;
pass the first traffic and the second traffic to the security element located in between the physical layer of the receiver and the MAC layer of the device;
the security element is further configured to:
detect that the first traffic is allowed to pass to the MAC layer of the device by applying one or more rules from a group of rules comprising: denial of service (DoS), man-in-the-middle (MiTM), traffic inspection, Transport Control Protocol (TCP), and Internet Protocol (IP) rules to:
identify a first MAC management frame in the first traffic, instead of a MAC control frame or a MAC data frame;
detect whether a predefined information element is present in an authentication field of the first MAC management frame; and
determine that the first traffic is allowed and not malicious, responsive to detecting that the predefined information element is present in the authentication field of the first MAC management frame; and
detect that the second traffic is not allowed to pass to the MAC layer of the device by applying the one or more rules from the group of rules to:
identify a second MAC management frame in the second traffic, instead of a MAC control frame or a MAC data frame;
detect whether the predefined information element is present in an authentication field of the second MAC management frame; and
determine that the second traffic is malicious and not allowed, responsive to a failure to detect the predefined information element in the authentication field of the second MAC management frame.

2. The non-transitory computer-readable storage medium according to claim 1, wherein the IDS computer program is configured to output one or more signals to the MAC layer of the device which cause the MAC layer of the device to disconnect from the wireless traffic.

3. The non-transitory computer-readable storage medium according to claim 1, wherein the IDS computer program is configured to output one or more signals to one or more further devices of the wireless network to prevent one or more types of attack on the one or more further devices.

4. The non-transitory computer-readable storage medium according to claim 1 in which analyzing the wireless traffic for a DoS attack comprises determining if the wireless traffic comprises spoofed MAC frames.

5. The non-transitory computer-readable storage medium according to claim 1 in which analyzing the wireless traffic for a DoS attack comprises determining an arrival rate of the wireless traffic and comparing the arrival rate of the wireless traffic determined with an acceptable threshold arrival rate.

6. The non-transitory computer-readable storage medium according to claim 1 in which analyzing the wireless traffic for a DoS attack comprises determining an arrival rate of the wireless traffic comprising any of device authentication traffic, device de-authentication traffic, device association traffic, and device disassociation traffic.

7. The non-transitory computer-readable storage medium according to claim 1 in which analyzing the wireless traffic for a man-in-the-middle attack comprises determining if the wireless traffic comprises spoofed or forged traffic.

8. The non-transitory computer-readable storage medium according to claim 1, wherein the group of rules comprise analyzing the wireless traffic for traffic from an unauthorized device of the wireless network.

9. The non-transitory computer-readable storage medium according to claim 1, wherein the group of rules comprise analyzing the wireless traffic by validating sequence numbers thereof.

10. The non-transitory computer-readable storage medium according claim 1, wherein the group of rules comprise analyzing the wireless traffic for exploitation of vulnerabilities in processing of the first and the second MAC management frames.

11. The non-transitory computer-readable storage medium according to claim 10 in which analyzing the wireless traffic for exploitation of vulnerabilities in the processing of the first and the second MAC management frames comprises determining an authentication mechanism for protecting the first and the second MAC management frames.

12. The non-transitory computer-readable storage medium according to claim 11 in which the authentication mechanism for protecting the first and the second MAC management frames comprises adding an authentication field to the first and the second MAC management frames.

13. The non-transitory computer-readable storage medium according to claim 1 in which preventing the second traffic from passing to the MAC layer of the device comprises destroying the second traffic.

14. The non-transitory computer-readable storage medium according to claim 1 in which preventing the second traffic from passing to the MAC layer of the device comprises detecting that the second traffic from a source is not allowed and dropping subsequent traffic from the source for a period of time.

15. The non-transitory computer-readable storage medium according claim 1, wherein the IDS computer program is configured to perform further functions comprising any of sending alerts to an administrator of the wireless network, logging activity on the wireless network, or conducting authentication of devices of the wireless network.

16. An intrusion detection and prevention system comprising:
a device comprising:
a receiver;
one or more hardware processors; and
a security element executed by the one or more hardware processors, the security element comprising an intrusion detection and prevention (IDS) program and situated in between a physical layer of the receiver of the device and the media access control (MAC) layer of the device of a wireless network, the security element configured to interface with a driver of a wireless network interface of the receiver and control traffic flow between the physical layer of the receiver of the device and the MAC layer of the device, and the security element is further configured to:

receive wireless traffic from the receiver of the device, the wireless traffic comprising first traffic and second traffic;

detect that the first traffic is allowed to pass to the MAC layer of the device by applying one or more rules from a group of rules comprising: denial of service (DoS), man-in-the-middle (MiTM), traffic inspection, Transport Control Protocol (TCP), or Internet Protocol (IP) to:

identify a first MAC management frame in the first traffic, instead of a MAC control frame or a MAC data frame;

detect whether a predefined information element is present in an authentication field of the first MAC management frame; and determine that the first traffic is allowed and not malicious, responsive to detecting that the predefined information element is present in the authentication field of the first MAC management frame; and detect that the second traffic is not allowed to pass to the MAC layer of the device by applying the one or more rules from the group of rules to:

identify a second MAC management frame in the second traffic, instead of a MAC control frame or a MAC data frame;

detect whether the predefined information element is present in an authentication field of the second MAC management frame; and determine that the second traffic is malicious and not allowed, responsive to a failure to detect the predefined information element in the authentication field of the second MAC management frame.

17. An intrusion detection and prevention method comprising the steps of:

receiving, by a physical layer of a receiver of a device of a wireless network, wireless traffic comprising first traffic and second traffic;

detecting, by a security element executing on one or more processors of the device, the security element comprising an intrusion detection and prevention (IDS) program and situated in between the physical layer of the receiver of the device and a media access control (MAC) layer of the device, the security element configured to interface with a driver of a wireless network interface of the receiver of the device and control traffic flow between the physical layer of the receiver of the device and the MAC layer of the device, that the first traffic is allowed to pass to the MAC layer by applying one or more rules from a group of rules comprising: denial of service (DoS), man-in-the-middle (MiTM), traffic inspection, Transport Control Protocol (TCP), or Internet Protocol (IP) to:

identify a first MAC management frame in the first traffic, instead of a MAC control frame or a MAC data frame;

detect whether a predefined information element is present in an authentication field of the first MAC management frame; and determine that the first traffic is allowed and not malicious, responsive to detecting that the predefined information element is present in the authentication field of the first MAC management frame; and passing, by the security element, the first traffic to the MAC layer of the device; and detecting, by the security element, that the second traffic is not allowed to pass to the MAC layer of the device by applying the one or more rules from the group of rules to:

identify a second MAC management frame in the second traffic, instead of a MAC control frame or a MAC data frame;

detect whether the predefined information element is present in an authentication field of the second MAC management frame; and determine that the second traffic is malicious and not allowed, responsive to a failure to detect the predefined information element in the authentication field of the second MAC management frame.

18. A device of a wireless network comprising:
one or more hardware processors;
a receiver configured to receive wireless traffic from the wireless network;
a media access control (MAC) layer; and
a security element executed by the one or more hardware processors, the security element comprising an intrusion detection and prevention (IDS) program and situated in between a physical layer of the receiver of the device and the MAC layer of the device, the security element configured to interface with a driver of a wireless network interface of the receiver and control traffic flow between the physical layer of the receiver of the device and the MAC layer of the device and the security element is further configured to:

receive the wireless traffic from the receiver of the device, the wireless traffic comprising first traffic and second traffic;

detect that the first traffic is allowed to pass to the MAC layer of the device by applying one or more rules from a group of rules comprising: denial of service (DoS), man-in-the-middle (MiTM), traffic inspection, Transport Control Protocol (TCP), or Internet Protocol (IP) to:

identify a first MAC management frame in the first traffic, instead of a MAC control frame or a MAC data frame;

detect whether a predefined information element is present in an authentication field of the first MAC management frame; and determine that the first traffic is allowed and not malicious, responsive to detecting that the predefined information element is present in the authentication field of the first MAC management frame; and detect that the second traffic is not allowed to pass to the MAC layer of the device by applying the one or more rules from the group of rules to:

identify a second MAC management frame in the second traffic, instead of a MAC control frame or a MAC data frame;

detect whether the predefined information element is present in an authentication field of the second MAC management frame; and determine that the second traffic is malicious and not allowed, responsive to a failure to detect the predefined information element in the authentication field of the second MAC management frame.

19. The device according to claim 18 in which the security element is situated between a driver of the receiver of the device and the MAC layer of the device.

20. The device according to claim 18 which comprises an access point (AP) of the wireless network.

21. The device according to claim 18 which comprises any of a wireless terminal, a wireless station, a client of the wireless network, such as any of a desktop computer, a laptop computer, a notebook computer, a tablet computer, a smartphone, a PDA, a point of sale (POS) device.

* * * * *